(12) United States Patent
Chakra et al.

(10) Patent No.: US 10,878,001 B2
(45) Date of Patent: Dec. 29, 2020

(54) IDENTIFYING RELATIONSHIPS AMONG A GROUP OF INDICATORS

(71) Applicant: INTERNATIONAL BUSINESS MACHINES CORPORATION, Armonk, NY (US)

(72) Inventors: Al Chakra, Apex, NC (US); Tian Ming Pan, Beijing (CN); Peng Fei Tian, Beijing (CN); Chu Yun Cloud Tony, Beijing (CN); Cheng Fang Wang, Beijing (CN); Renfu Ma, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 16/019,656

(22) Filed: Jun. 27, 2018

(65) Prior Publication Data
US 2020/0004871 A1 Jan. 2, 2020

(51) Int. Cl.
*G06F 16/00* (2019.01)
*G06F 16/28* (2019.01)
(Continued)

(52) U.S. Cl.
CPC ............ *G06F 16/287* (2019.01); *G06F 16/26* (2019.01); *G06F 17/15* (2013.01)

(58) Field of Classification Search
CPC ........ G06F 16/287; G06F 16/26; G06F 16/00; G06F 17/15; G06F 17/18; G06F 7/5443;
(Continued)

(56) References Cited

U.S. PATENT DOCUMENTS

| 7,194,421 B2 | 3/2007 | Conkwright et al. |
| 8,095,415 B1 * | 1/2012 | Thomas ........... G06Q 10/06393 705/7.39 |

(Continued)

FOREIGN PATENT DOCUMENTS

WO    2005015404 A3    2/2005

OTHER PUBLICATIONS

Duan, Lian et al., "Selecting the Right Correlation Measure for Binary Data" ACM Transactions on Knowledge Discovery from Data; vol. 9, No. 2, Article 13; Publication date: Sep. 2014; pp. 13:1-13:28.

(Continued)

*Primary Examiner* — Anh Ly
(74) *Attorney, Agent, or Firm* — Cantor Colburn LLP; Teddi Maranzano

(57) ABSTRACT

Methods, systems, and computer program products for identifying relationships among a group of indicators are provided. Aspects include obtaining the group of indicators, including a number of indicators relating to an operation of a computing system. Aspects also include creating pairs of indicators, wherein the pairs of indicators includes all possible combination of the group of indicators. Aspects further include, for each pair of indicators, calculating a linear correlation score, calculating a fitting function score, determining a final correlation score based at least in part on one of the linear correlation score and the fitting function score and storing the final correlation score in a relationship database. Aspects also include creating a graphical display based on the relationship database, wherein the graphical display is configured to convey a strength relationships among the group of indicators.

17 Claims, 5 Drawing Sheets

(51) Int. Cl.
*G06F 17/15* (2006.01)
*G06F 16/26* (2019.01)

(58) Field of Classification Search
CPC ......... G06F 17/30572; G06F 17/30601; G06F 16/2246; G06F 16/223; G06F 16/216; G06F 16/23; G06F 16/2237; G06F 11/3003; G06F 16/2228; G06F 16/901; G06N 20/00; G06N 99/005; G06N 5/048; H03H 17/00; G06Q 10/04; G09B 19/00
See application file for complete search history.

(56) References Cited

U.S. PATENT DOCUMENTS

| | | |
|---|---|---|
| 8,132,122 B2 | 3/2012 | Risch et al. |
| 8,849,823 B2 | 9/2014 | Gotz et al. |
| 9,697,470 B2 | 7/2017 | Iskandar et al. |
| 9,704,143 B2 | 7/2017 | Walker et al. |
| 9,916,605 B2 | 3/2018 | Assem Aly Salama et al. |
| 2009/0063304 A1* | 3/2009 | Meggs .................. G06Q 10/10 705/26.62 |
| 2009/0164913 A1* | 6/2009 | Davar .................... H04L 67/02 715/751 |
| 2010/0106426 A1* | 4/2010 | Hunt .................... G06K 9/3233 702/19 |
| 2012/0066618 A1* | 3/2012 | Barker ................ H04L 12/1813 715/753 |
| 2014/0074843 A1* | 3/2014 | White ................. G06F 16/3344 707/737 |
| 2014/0079297 A1* | 3/2014 | Tadayon ............ G06K 9/00288 382/118 |
| 2015/0142811 A1* | 5/2015 | Henry .................. G06F 16/285 707/738 |
| 2017/0013486 A1* | 1/2017 | Beyme ................ H04W 72/085 |
| 2018/0101869 A1* | 4/2018 | Zacharatos ........ G06Q 30/0275 |
| 2018/0197095 A1* | 7/2018 | Sponaugle ......... G06Q 30/0201 |
| 2019/0068659 A1* | 2/2019 | Davar ................... G06Q 30/06 |

OTHER PUBLICATIONS

Xiong, Hui et al., "Exploiting a Support-based Upper Bound of Pearson's Correlation Coefficient for Efficiently Identifying Strongly Correlated Pairs", Research Track Paper; KDD'04; Aug. 22-25, 2004; Seattle, Washington, USA, Copyright 2004 ACM; pp. 334-343.

* cited by examiner

IDENTIFYING RELATIONSHIPS AMONG A GROUP OF INDICATORS

BACKGROUND

The invention relates generally to identifying relationships among a group of indicators and, more specifically, to analyzing pairs of indicators to identify relationships between indicators.

Computing systems, such as transaction processing systems, are a source of data that can be used to gain valuable business insights. Accordingly, research has been performed on using machine learning to identify these business insights. In most cases, when user trains a machine learning model for each indicator in a computing system, the indicators are evaluated as a time-series of data points.

SUMMARY

According to an embodiment, a system for identifying relationships among a group of indicators is provided. The system includes a memory having computer readable computer instructions, and a processor for executing the computer readable instructions. The computer readable instructions include instructions for obtaining the group of indicators, including a number of indicators relating to an operation of a computing system. The computer readable instructions also include instructions for creating pairs of indicators, wherein the pairs of indicators include all possible combination of the group of indicators. The computer readable instructions further include instructions for, for each pair of indicators, calculating a linear correlation score, calculating a fitting function score, determining a final correlation score based at least in part on one of the linear correlation score and the fitting function score and storing the final correlation score in a relationship database. The computer readable instructions also include instructions for creating a graphical display based on the relationship database, wherein the graphical display is configured to convey a strength relationships among the group of indicators.

According to another embodiment, a method for identifying relationships among a group of indicators is provided. The method includes obtaining the group of indicators, including a number of indicators relating to an operation of a computing system. The method also includes creating pairs of indicators, wherein the pairs of indicators includes all possible combination of the group of indicators. The method further includes, for each pair of indicators, calculating a linear correlation score, calculating a fitting function score, determining a final correlation score based at least in part on one of the linear correlation score and the fitting function score and storing the final correlation score in a relationship database. The method also includes creating a graphical display based on the relationship database, wherein the graphical display is configured to convey a strength relationships among the group of indicators.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes obtaining the group of indicators, including a number of indicators relating to an operation of a computing system. The method also includes creating pairs of indicators, wherein the pairs of indicators includes all possible combination of the group of indicators. The method further includes, for each pair of indicators, calculating a linear correlation score, calculating a fitting function score, determining a final correlation score based at least in part on one of the linear correlation score and the fitting function score and storing the final correlation score in a relationship database. The method also includes creating a graphical display based on the relationship database, wherein the graphical display is configured to convey a strength relationships among the group of indicators.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
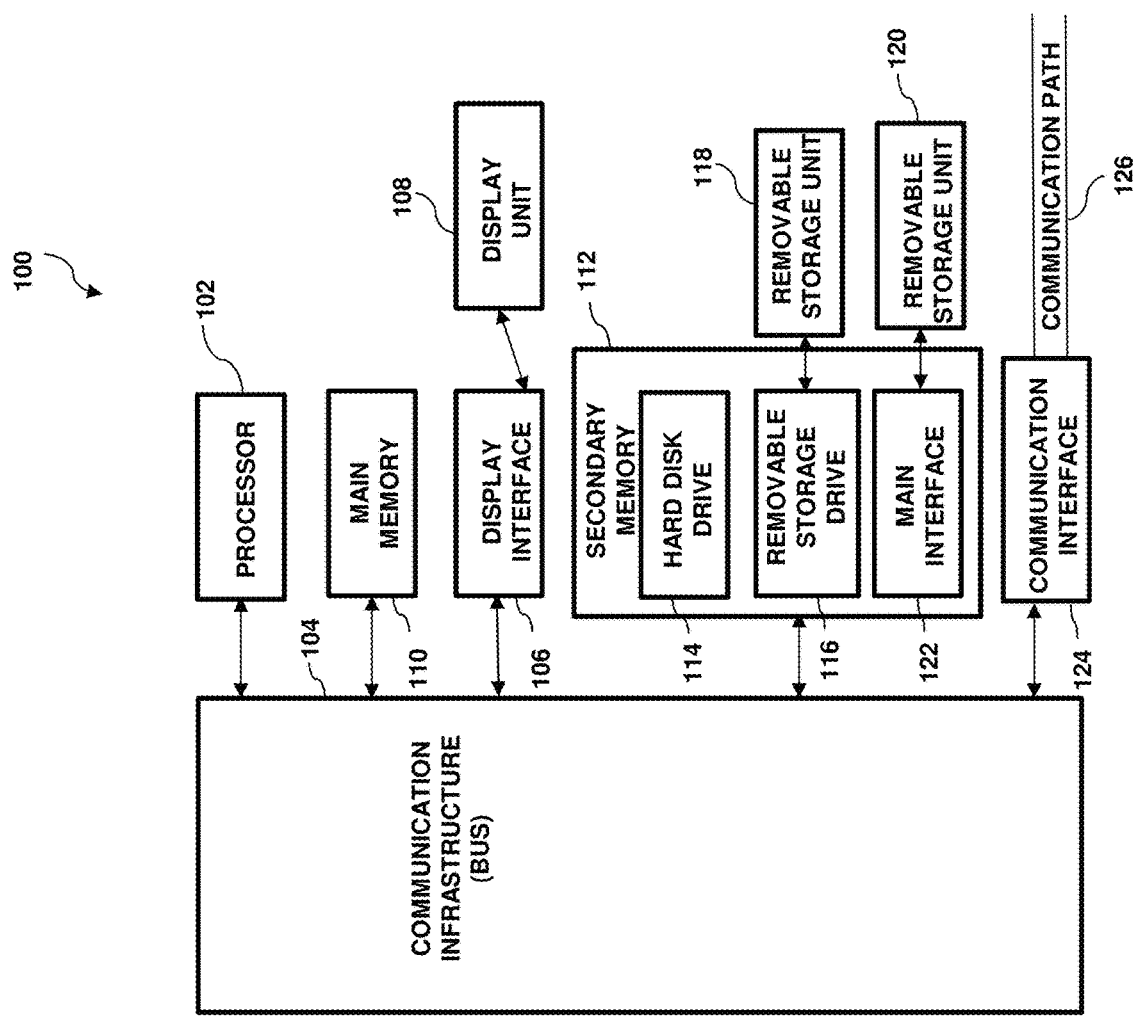
FIG. 1 depicts an exemplary computer system capable of implementing one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to a more detailed description of aspects of the present invention, FIG. 1 illustrates a high-level block diagram showing an example of a computer-based system 100 useful for implementing one or more embodiments of the invention. Although one exemplary computer system 100 is shown, computer system 100 includes a communication path 126, which connects computer system 100 to additional systems and may include one or more wide area networks (WANs) and/or local area networks (LANs) such as the internet, intranet(s), and/or wireless communication network(s). Computer system 100 and additional systems are in communication via communication path 126, (e.g., to communicate data between them).

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a floppy disk drive, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by a removable storage drive 116. As will be appreciated, removable storage unit 118 includes a computer readable medium having stored therein computer software and/or data.

In some alternative embodiments of the invention, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etc. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110, and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

In exemplary embodiments, a system for identifying relationships among a group of n indicators is provided. The group of indicators include performance data, or metrics, for a separate computing system, such as a transaction processing system and can also include discretized time data. This group of indicators are split into n(n−1) pairs of indicators and each pair of indicators is analyzed and assigned a linear value score and a fitting function score. If either the absolute value of linear value score or one minus the fitting function score exceed a threshold value, the larger of the absolute value of linear value score and one minus the fitting function score is stored as a final correlation score in a relationship database. In exemplary embodiments, the relationship database stores the final correlation score for each combination of indicators and optionally the function associated with that final correlation score. The data stored in the relationship database can be visualized using a ranking map that illustrates a group of indicators that are correlated with a user selected indicator or using a correlation map that includes a node for each indicator and a connector between each related pair of indicators. In exemplary embodiments, the thickness of a connector between the nodes of the ranking or correlation map is positively correlated with the final correlation score associated with the pair of indicators associated with the nodes.

Figure 2:
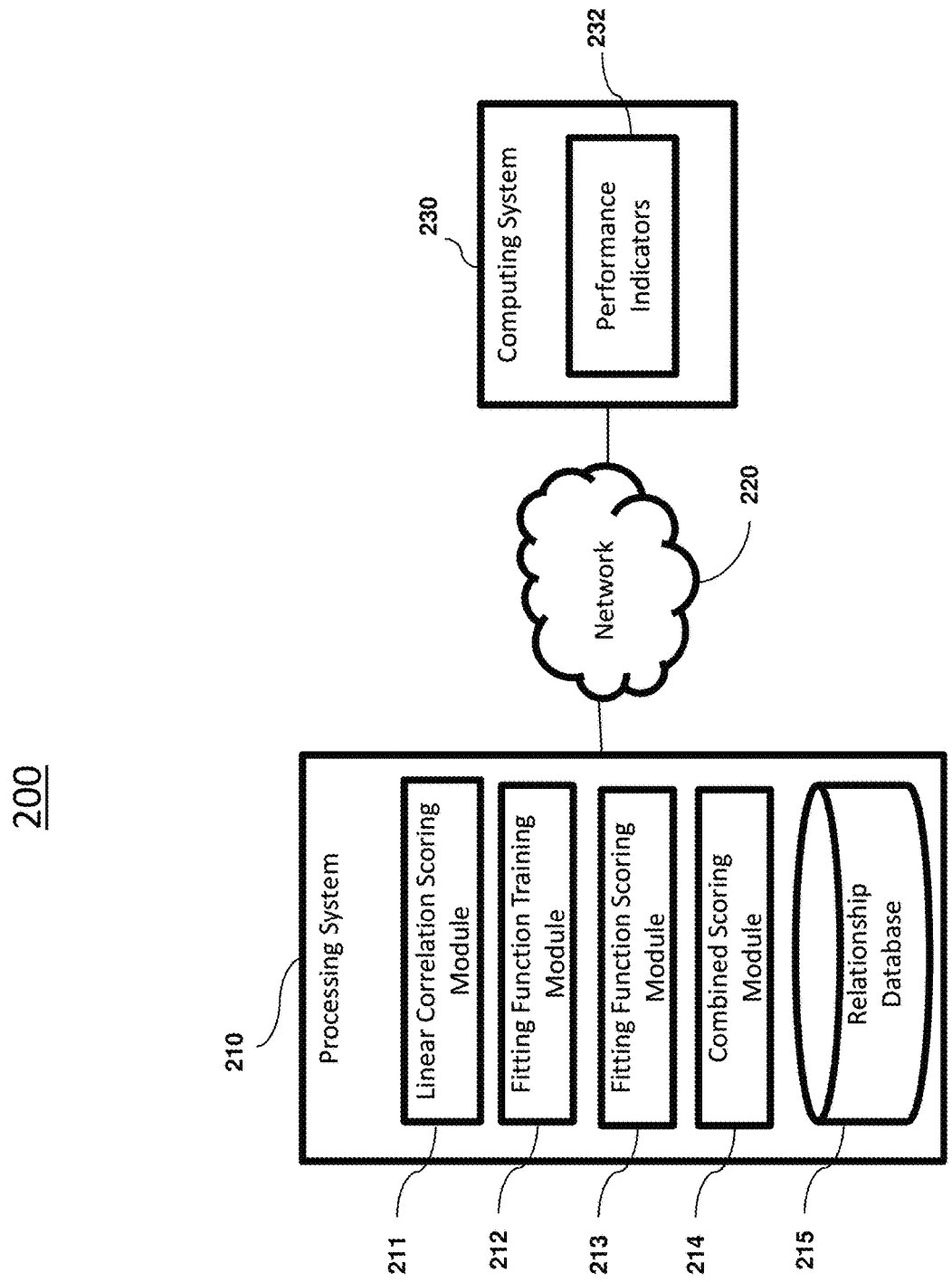
FIG. 2 depicts a system for identifying relationships among a group of indicators according to one or more embodiments of the present invention.

Turning now to FIG. 2, a system 200 upon which identifying relationships among a group of indicators may be implemented will now be described in accordance with an embodiment. The system 200 shown in FIG. 2 includes a computing system 230 in communication with a processing system 210 via a communications network 220. The communications network 220 may be one or more of, or a combination of, public (e.g., Internet), private (e.g., local area network, wide area network, virtual private network), and may include wireless and wireline transmission systems (e.g., satellite, cellular network, terrestrial networks, etc.).

The performance of the computing system 230 is characterized by a plurality of performance indicators 232. In one embodiment, the computing system 230 is a transaction processing system and the performance indicators include a transaction processing rate, a total number of pending transactions, an average transaction response time, and the like. The performance indicators 232 are collected by the computing system 230 and are provided to the processing system 210 for analysis.

The processing system 210 includes a linear correlation scoring module 211, a fitting function training module 212, a fitting function scoring module 213, a combined scoring module 214, and a relationship database 215. The processing system 210 may be implemented as a computer system such as the one shown in FIG. 1. In exemplary embodiments, the processing system 210 receives the performance indicators 232 from the computing system 230. The performance indicators 232 include a plurality of indicators that are combined with a time indicator to form a group of n indicators.

In exemplary embodiments, the processing system 210 performs a standardization on the performance indicators 232 received so that the data can be processed by the linear correlation scoring module 211, a fitting function training module 212, a fitting function scoring module 213. For example, one performance indicator 232 may be a performance metric that is captured once every ten seconds while another performance indicator 232 is captured once every five seconds. In this example, the standardization can include reducing the data set from the more frequently captured data by discarding every other data point. Likewise, the standardization can include interpolating or duplicating data in the less frequently captured data set. Additional data standardization techniques can also be performed. In exemplary embodiments, the computing system 230 is configured to provide the processing system 210 with data, such as the sampling rate, for each of the performance indicators 232.

The processing system 210 is configured to create n(n−1) groups from the n indicators, which represent every possible combination of the indicators. Once the pairs have been created, the linear correlation scoring module 211 calculates a linear correlation score for each pair. In one embodiment, the linear correlation score is calculated by:

$$\rho_{xy} = \frac{\sum (X_i - \overline{X})(Y_i - \overline{Y})}{\sqrt{\sum (X_i - \overline{X})^2 \sum (Y_i - \overline{Y})^2}}$$

Each pair is also provided to the fitting function training module 212, which can use any of a variety of known techniques to analyze the data pair and to responsively identify a function that represents the correlation between the indicators. Once the function is identified, it is provided to the function scoring module 213 along with the indicator data. The function scoring module 213 then calculates a fitting function score that indicates how well the pair of indicators conforms to the identified function. In one embodiment, the fitting function score can be a value of one minus a root mean squared deviation of:

$$RMSE(X, h) = \sqrt{\frac{1}{m} \sum_{i=1}^{m} (h(x^{(i)}) - y^{(i)})^2}$$

where h is the identified function and X is a matrix containing all the feature values (excluding labels) of all instances in the dataset. There is one row per instance and the i row is equal to the transpose of $x^{(i)}$. m is the number of instances in the dataset you are measuring the RMSE of. For example, if you are evaluating the RMSE on a validation set of 2,000 districts, then m=2,000.

Next, the combined scoring module 214 evaluates an absolute value of the linear correlation score and one minus the fitting function score to determine a final correlation score. Since a higher root mean square indicates a poorer fit between the data and the identified function, one minus the fitting function score is used to by the combined scoring module 214. In exemplary embodiments, the final correlation score is determined to be zero based on determining that an absolute value of the linear correlation score is less than a threshold number, for example 0.5, and that one minus the fitting function score is less than the threshold number. Otherwise, the final correlation score is determined to be a greater of the absolute value of the linear correlation score and one minus the fitting function score.

The final correlation score is stored in the relationship database 215. In exemplary embodiments, the function that corresponds to the calculated final correlation score is also stored in the relationship database 215. For example, if the final correlation score is the linear correlation score, a liner function in the form of y=mx+b is stored in the relationship database 215. If the final correlation score is the fitting function score then a function identified by the fitting function training module 212 is stored in the relationship database 215.

Figure 3:
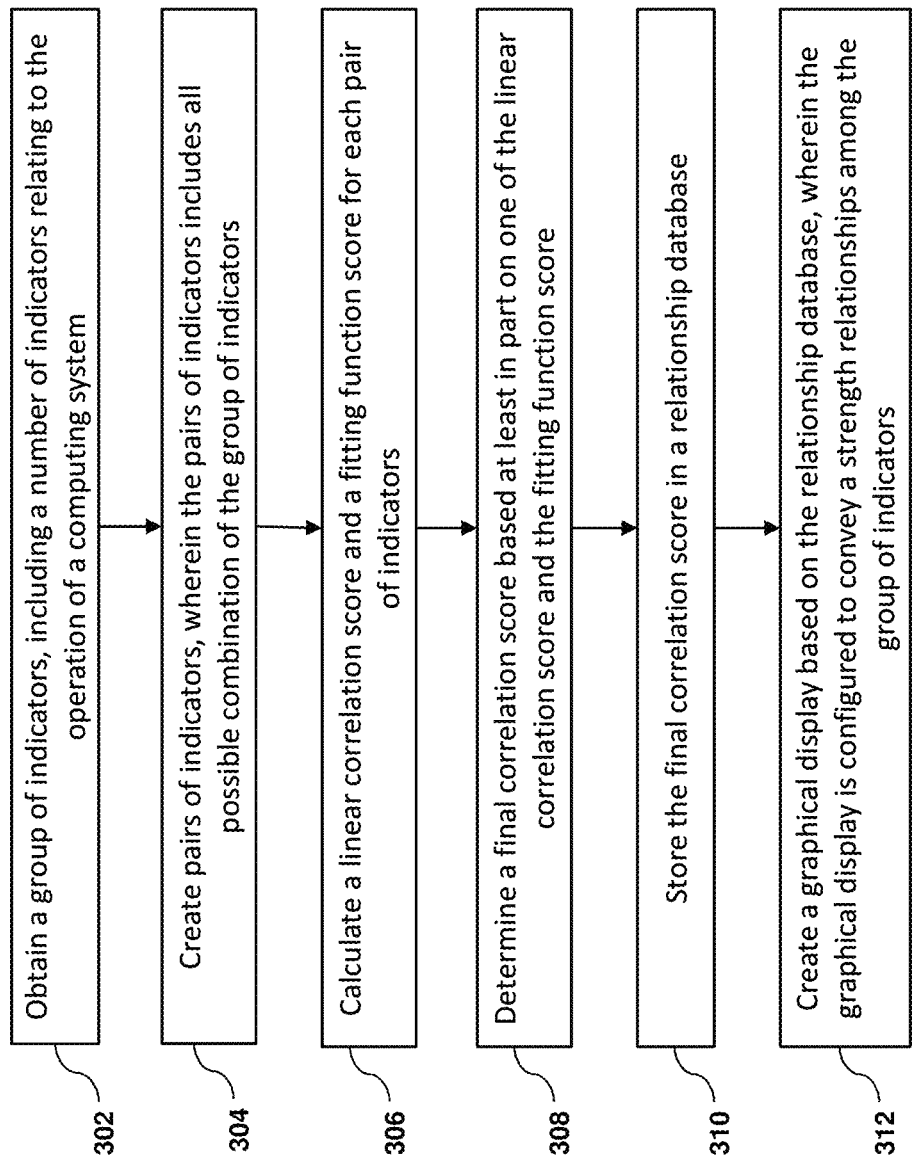
FIG. 3 depicts a flow diagram of a method for identifying relationships among a group of indicators according to one or more embodiments of the present invention.

Referring now to FIG. 3 a flow diagram of a method for identifying relationships among a group of indicators according to one or more embodiments of the present invention is shown. The method 300 includes obtaining the group of indicators, including a number of indicators relating to the operation of a computing system, as shown at block 302. In exemplary embodiments, the group of indicators includes a time indicator that has been discretized. Next, as shown at block 304, the method 300 includes creating pairs of indicators, wherein the pairs of indicators include all possible combination of the group of indicators. The method 300 further includes calculating a linear correlation score and a fitting function score for each pair of indicators, as shown at block 306. Next, as shown at block 308, the method 300 includes determining a final correlation score based at least in part on one of the linear correlation score and the fitting function score. The final correlation score in stored a relationship database, as shown at block 310. Next, as shown at block 312, the method 300 includes creating a graphical display based on the relationship database, wherein the graphical display is configured to convey a strength of the relationship among the group of indicators. In exemplary embodiments, the graphical display can include a ranking map 400, such as the one shown in FIG. 4, or a correlation map 500, such as the one shown in FIG. 5.

Figure 4:
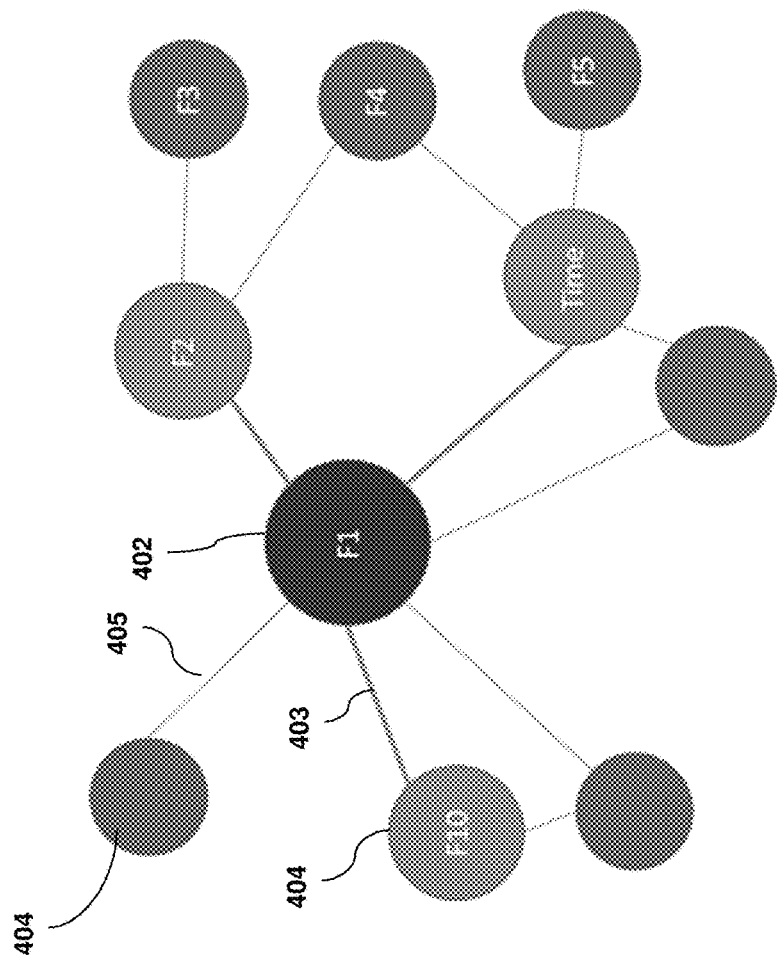
FIG. 4 depicts a ranking map for a selected indicator from a group of indicators according to one or more embodiments of the present invention.

Referring now to FIG. 4 a ranking map 400 for a selected indicator 402 from a group of indicators according to one or more embodiments of the present invention is shown. The ranking map 400 is created based on a selected indicator 402 that is identified by a user and includes nodes 404 for all of the indicators that have a non-zero final correlation score with the selected indicator 402. A thickness of the connections 403, 405 between the selected indicator 402 and the nodes 404 are used to illustrate the strength of the correlation between the selected indicator 402 and the indicator represented by the nodes 404. For example, more highly correlated indicators are connected to the selected indicator 402 by thicker lines. In addition, a size of the nodes 404 and the selected indicator 402 can be based on a numeric value for indicator associated with the node.

Figure 5:
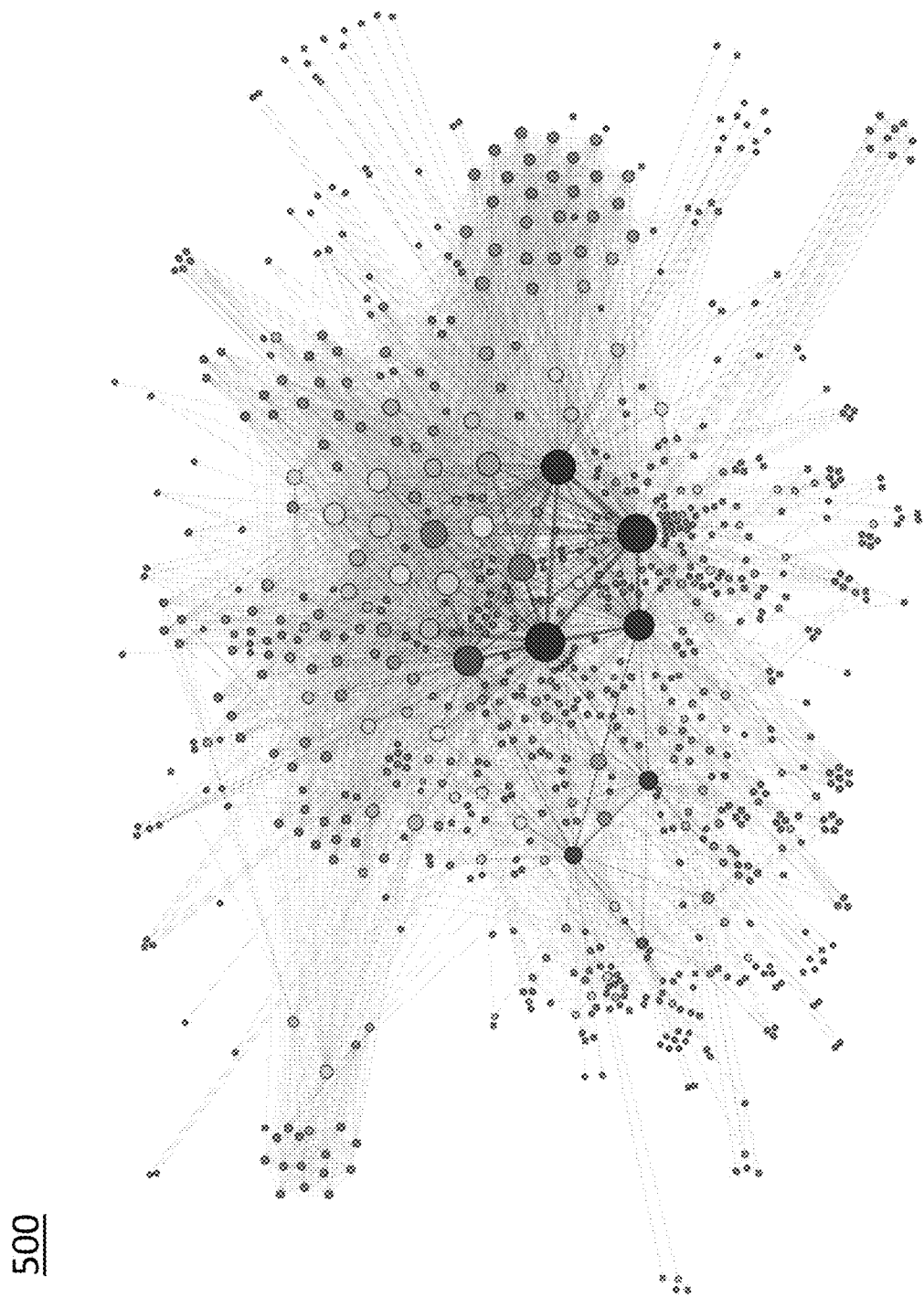
FIG. 5 depicts a correlation map for a group of indicators according to one or more embodiments of the present invention.

FIG. 5 depicts a correlation map 500 for a group of indicators according to one or more embodiments of the present invention. The topology of the correlation map 500 is similar to the ranking map 400, but the correlation map 500 is configured to illustrate all of the data stored in the relationship database.

In exemplary embodiments, the ranking map and/or the correlation map can be used to visualize the relationships between indicators and to evaluate the effects of changes to a desired indicator. The ranking map 400 can display a value for each of the nodes 404 and the selected indicator 402 and can be configured to allow the user to propose a change to one of these values. In response to receiving the proposed change to one of these values, the ranking map can calculate new values for each of the displayed nodes that illustrate changes that would be needed to be made to the computing system to effectuate the proposed change.

For example, the ranking map 400 may include a selected indicator 402 of an average response time and correlated indicators of a number of processing cores, memory utilization, transactions rate, and the like. If the user were to enter a proposed average response time that was half of the displayed average response time, the ranking map 400 would be updated to illustrate new values for the number of processing cores, memory utilization, transactions rate, and the like that would be needed to achieve the desired reduction in the response time. These values are calculated based on the final correlation score and functions stored in the relationship database.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for identifying relationships among a group of indicators, comprising:
    a memory having computer readable instructions; and
    a processor for executing the computer readable instructions, the computer readable instructions including instructions for:
        obtaining the group of indicators, including a number of indicators relating to an operation of a computing system;
        creating pairs of indicators, wherein the pairs of indicators includes all possible combination of the group of indicators;
        for each pair of indicators:
        calculating a linear correlation score;
        calculating a fitting function score;
        determining a final correlation score based at least in part on one of the linear correlation score and the fitting function score; and
        storing the final correlation score in a relationship database;
        creating a graphical display based on the relationship database, wherein the graphical display is configured to convey a strength relationships among the group of indicators, wherein the graphical display is a correlation map that includes a node for each indicator and a connector between each related pair of indicators, wherein a pair of indicators are determined to be related if there final correlation score is non-zero.

2. The system of claim 1, wherein the group of indicators include a discretized time indicator.

3. The system of claim 1, wherein the computer readable instructions including instructions for standardizing each of the group of indicators prior to creating the pairs of indicators.

4. The system of claim 1, wherein the final correlation score is determined to be zero based on determining that an absolute value of the linear correlation score is less than a threshold number and that one minus the fitting function score is less than the threshold number.

5. The system of claim 4, wherein the final correlation score is determined to be a greater of the absolute value of the linear correlation score and one minus the fitting function score.

6. The system of claim 1, wherein the graphical display is a ranking map for a selected indicator from the group of indicators that includes nodes for each of the group of indicators that have final correlation scores with the selected indicator that exceeds a threshold value.

7. The system of claim 6, wherein a thickness of a connector between the nodes of the ranking map is positively correlated with the final correlation score associated with the pair of indicators associated with the nodes that are connected by the connector.

8. A method for identifying relationships among a group of indicators, the method comprising:
    obtaining the group of indicators, including a number of indicators relating to an operation of a computing system;
    creating pairs of indicators, wherein the pairs of indicators includes all possible combination of the group of indicators;
    for each pair of indicators:
    calculating a linear correlation score;
    calculating a fitting function score;
    determining a final correlation score based at least in part on one of the linear correlation score and the fitting function score; and
    storing the final correlation score in a relationship database;
    creating a graphical display based on the relationship database, wherein the graphical display is configured to convey a strength relationships among the group of indicators, wherein the graphical display is a correlation map that includes a node for each indicator and a connector between each related pair of indicators, wherein a pair of indicators are determined to be related if there final correlation score is non-zero.

9. The method of claim 8, wherein the group of indicators include a discretized time indicator.

10. The method of claim 8, further comprising standardizing each of the group of indicators prior to creating the pairs of indicators.

11. The method of claim 8, wherein the final correlation score is determined to be zero based on determining that an absolute value of the linear correlation score is less than a threshold number and that one minus the fitting function score is less than the threshold number.

12. The method of claim 11, wherein the final correlation score is determined to be a greater of the absolute value of the linear correlation score and one minus the fitting function score.

13. The method of claim 8, wherein the graphical display is a ranking map for a selected indicator from the group of indicators that includes nodes for each of the group of indicators that have final correlation scores with the selected indicator that exceeds a threshold value.

14. The method of claim 13, wherein a thickness of a connector between the nodes of the ranking map is positively correlated with the final correlation score associated with the pair of indicators associated with the nodes that are connected by the connector.

15. A computer program product comprising a non-transitory computer readable storage medium having program instructions embodied therewith the program instructions executable by a computer processor to cause the computer processor to perform a method, comprising:

obtaining a group of indicators, including a number of indicators relating to an operation of a computing system;

creating pairs of indicators, wherein the pairs of indicators includes all possible combination of the group of indicators;

for each pair of indicators:

calculating a linear correlation score;

calculating a fitting function score;

determining a final correlation score based at least in part on one of the linear correlation score and the fitting function score; and storing the final correlation score in a relationship database;

creating a graphical display based on the relationship database, wherein the graphical display is configured to convey a strength relationships among the group of indicators, wherein the graphical display is a correlation map that includes a node for each indicator and a connector between each related pair of indicators, wherein a pair of indicators are determined to be related if there final correlation score is non-zero.

16. The computer program product of claim 15, wherein the final correlation score is determined to be zero based on determining that an absolute value of the linear correlation score is less than a threshold number and that one minus the fitting function score is less than the threshold number.

17. The computer program product of claim 16, wherein the final correlation score is determined to be a greater of the absolute value of the linear correlation score and one minus the fitting function score.

* * * * *